United States Patent Office 3,393,116
Patented July 16, 1968

3,393,116
GYPSUM COMPOSITION HAVING DEHYDRATION RESISTANT CHARACTERISTICS
Kenneth R. Larson, Mount Prospect, Ill., assignor to United States Gypsum Company, Chicago, Ill., a corporation of Illinois
No Drawing. Filed Aug. 30, 1965, Ser. No. 483,776
7 Claims. (Cl. 161—43)

ABSTRACT OF THE DISCLOSURE

A composition comprising calcium sulfate hemihydrate, boric acid and glycerol; said composition being convertible into a formable mixture that is capable of setting to a hard gypsum upon admixture with an amount of water in excess of that required to hydrate said hemihydrate to the dihydrate; said hard gypsum product being characterized by substantial resistance to dehydration at a temperature of 150° F.

---

This invention relates to a composition of matter adapted to form gypsum products having significantly improved resistance to dehydration. More particularly, this invention relates to the combined use of boric acid and glycerol as additives to calcium sulfate hemihydrate to retard the dehydration of gypsum products formed after combining the hemihydrate with necessary water of crystallizaiton.

Crystallized calcium sulfate dihydrate or gypsum may be in a myriad of forms such as planar plaster surfacings and cores for gypsum boards including paper-covered wallboards, sheathing and the like. Gypsum is formed by combining calcium sulfate hemihydrate with adequate water of hydration. In the course of "setting," the dihydrate crystallizes out. If the hemihydrate or plaster of Paris is 100% pure, the amount of water needed to form the dihydrate comprises 18.6% by weight of the hemihydrate. In normal practice, an excess of water is necessary for producing a workable and flowable slurry which is formed into a wall coating, wallboard core or the like. The amount of this excess varies and is readily determinable by those skilled in the art. This excess water must, of course, be removed by drying after the dihydrate has formed so that the full strength of the resulting gypsum may be realized.

Ordinary gypsum products, when subjected to elevated temperatures of about 105–110° F. tend to lose water of crystallization. As a result, the strong calcium sulfate dihydrate crystals degenerate and revert to the hemihydrate. The destruction of the dihydrate crystalline structure results in a loss in strength as the gypsum body such as a plaster wall or gypsum board core becomes soft and chalky. A plaster surface will reveal increasingly unsightly cracks as the dehydration progresses.

A gypsum board core will become progressively weak, beginning at the outer surface and working inwardly as the zone of dehydration extends inwardly. Thus, the initial core dehydration will be evidenced by poor adhesion or lack of bond between the core and paper cover; as the dehydration continues the inner core portion also becomes dehydrated resulting ultimately in a board which has insufficient strength for any structural use.

It is appreciated from the above, that unless the water of crystallization of gypsum products is retained in high-temperature environments, deterioration of the gypsum will result. This problem has been particularly acute in plaster coatings and the supporting plaster base therefor utilized in radiant heating systems. Such systems employ heat-radiating means, such as electrical resistance elements embedded beneath a plaster surfacing and which may be disposed over a gypsum board plaster base to which the elements are secured. Since the temperature created by the heat radiating from the elements in such systems may reach 120–125° F. or higher to appreciably warm the atmosphere adjacent the plaster covering, the plaster adjacent the heating elements has heretofore on occasion cracked and the strength thereof deteriorated while the gypsum was dehydrated as its water of crystallization was driven off. Similarly, the plaster base had deteriorated in structural integrity at heating system temperatures which caused dehydration of the gypsum.

It is an object of this invention to provide a novel composition adapted to form hard gypsum bodies which tenaciously retain water of crystallization at temperatures in excess of those normally found in radiant heating systems.

More specifically, it is another object of this invention to provide the combination of boric acid and glycerol as additives to calcium sulfate hemihydrate for purposes of significantly retarding the dehydration of the set gypsum product formed therefrom after the hemihydrate has been combined with the necessary water of hydration.

It is another object of this invention to provide additives to retard the dehydration of gypsum, said additives not being noticeably affected by other additives normally employed in modifying properties of the initial slurry or the final gypsum product formed therefrom.

The above and other objects of this invention will become more apparent in the light of the following detailed discussion and appended claims.

It has been found that if calcium sulfate hemihydrate is combined with minute quantities comprising approximately 0.05% to 0.65% of boric acid and 0.05% to 1.25% of glycerol based on the weight of the hemihydrate, gypsum products formed from such combination after mixing the same with a quantity of water necessary to effect formation of the dihydrate crystalline structure will tenaciously retain such water of crystallization. Since substantially all major sources of gypsum rock contain some impurities, such impurities should be deducted from the hemihydrate weight in the course of ascertaining the weight of glycerol and boric acid additives based thereon. Thus, although gypsum water of crystallization is normally driven off at a temperature of about 105–110° F., gypsum products formed in combination with the above additives will release substantially no water whatsoever, even after being subjected to a temperature of 150° F. for two hours. Such gypsum products thus are most gainfully employed in radiant heating installations in which temperatures of 125° F. are imparted to gypsum materials disposed adjacent the radiant heating means.

Also, the use of additives normally employed in plaster compositions to improve the working properties of the plaster mix or the properties of the final gypsum surfacing has been found to be in no way materially affect the desired water-retaining qualities imparted to the gypsum surfacing by the boric acid and glycerol additives. Similarly the boric acid and glycerol do not interfere with the functioning of other conventional additives.

For purposes of demonstrating the effects of the combination of boric acid and glycerol on calcium sulfate hemihydrate adapted to form gypsum products, the following table is presented. The various specimens set forth in the following table were in the form of slabs ½ inch by 2 inches by 6 inches. Each slab was dried at 110° F. to constant weight and then exposed to a constant temperature of 150° F. in a laboratory oven. The additive percentages are based on the weight of the calcium sulfate hemihydrate employed in forming the various specimens.

TABLE

| Time of Exposure At 150° F. (days) | Percent Moisture Loss | | | |
| --- | --- | --- | --- | --- |
| | No. Glycerol or Boric Acid | 0.5% Glycerol | 0.5% Boric Acid | 0.5% Boric Acid, 0.5% Glycerol |
| 3 | 3.85 | 1.07 | .89 | .33 |
| 4 | 5.87 | 1.54 | 1.46 | .39 |
| 5 | 7.67 | 1.91 | 2.20 | .46 |
| 6 | 8.97 | 2.18 | 3.12 | .56 |
| 7 | 9.53 | 2.46 | 4.10 | .70 |

It will be seen from the table that the combination of boric acid and glycerol is vastly superior to either additive alone for purposes of retaining the water of crystallization in the gypsum specimens. At the end of seven days or 168 hours, the specimen employing both boric acid and glycerol had not yet lost 1% by weight of moisture. The reason for the beneficial synergistic effect provided by the combination of boric acid and glycerol is not yet known; however, the above table clearly displays a cooperation between the additives which provides a desirable result unattainable by either additive alone.

It should be appreciated that although the specimen of the table employing both additives lost some moisture, the applied heat was greatly in excess of that normally imparted by heating cables which are actuated intermittently for short periods of time in a radiant heating installation.

The above specimens of the table were free of any additives normally found in gypsum products. It has been found, however, that the presence of foams, fibers, bonding agents, accelerators, retarders and other additives normally found in gypsum bodies such as gypsum board cores in no way materially affects the increase in retention of the water of crystallization imparted to the cores by the combination of boric acid and glycerol.

It has in addition been found that when gypsum board cores contained the boric acid and glycerol additives within the prescribed ranges of .05%–.65% and .05%–1.25%, respectively, based on the weight of calcium sulfate hemihydrate, the bond of the board fibrous wrapper to the core remained firm and secure despite the presence of elevated temperatures, as demonstrated by the following test.

An X was cut in an edge portion of a paper wrapper normally employed in plaster base and disposed about a gypsum core of a plaster base board adapted for use in a radiant heating system. The core contained 0.3% of boric acid and 0.5% of glycerol based on the original weight of the hemihydrate and was subjected to an oven temperature of 150° F. for 168 hours. When an attempt was made to pull each of the four paper tabs defining the X from the underlying gypsum surface, paper laminations parted. The bond between the gypsum and the paper did not give nor did outer surface portions of the gypsum core fracture during this test. The latter test clearly disclosed that the bond of the paper to the gypsum core was still excellent and that the outermost gypsum surface adjacent the paper had not been weakened by dehydration despite being subjected to the elevated temperature of 150° F. for an extended period of time.

In addition to core compositions, the additives of glycerol and boric acid may be incorporated in plaster compositions intended to form a surfacing adapted to be subjected to temperatures as high as 150° F. without deleterious effects.

The following plaster composition when combined with sufficient water to crystallize the hemihydrate and render the resulting plaster mix workable was applied in a one-quarter inch thick layer over a plaster base 18 inches square having an electric cable securely stapled thereto. The plaster was allowed to dry to a constant weight in an oven maintained at 110° F.

Calcium sulfate hemihydrate _____ lbs__ 100
Calcium sulfate anhydrite, insoluble (adds to plaster fluidity during troweling) _____ lbs__ 10
Sand (aggregate) _____ lbs__ 60
Double hydrated dolomitic lime (assists action of the retarder and improves workability of plaster during troweling) _____ lbs__ 5
Polyvinyl acetate, spray dried (retains water during working of the plaster) _____ lbs__ .55
Perlite fines (aggregate, facilitates troweling of finish coat) _____ cubic foot__ 0.05
Tartaric acid (retarder) _____ lbs__ .025
Boric acid _____ lbs__ .25
Glycerol _____ lbs__ .5

The cable covered by the above composition was a "Ceil-Heat" #C-102 cable manufactured by Ceil-Heat, Inc., of Knoxville, Tenn. The cable was arranged in loops in which all cable portions were at least 1½ inches from the plaster edges and the cable runs were on 1½ inch centers. A voltage was applied to the cable to attain a temperature of 150° F. as determined by a thermocouple attached to the cable sheath at the plaster panel center. Continuous maintenance of the 150° F. temperature for two hours resulted in no detectable weight loss in either the plaster base (having a core containing 0.5% boric acid and 0.5% glycerol) or the plaster covering.

It will be noted that the foregoing plaster surfacing employed a number of conventional additives, the functions of which are set forth. The plaster base core similarly possessed conventional additives normally found in gypsum cores. It is apparent that the additives in no way interfered with the ability of the boric acid and glycerol to retain the water of crystallization of the dihydrate surfacing.

The glycerol and boric acid additives provide no processing difficulties in formation of either the plaster or core compositions. The plaster composition may be sold in a bag for use at the job site whereat all that need be added is the necessary water to hydrate the hemihydrate and provide a consistency suitable for troweling. The glycerol which is a syrupy liquid at room temperature may be first mixed with the sand normally employed in the plaster, after which the coated sand and other additives including boric acid are mixed and packaged with the hemihydrate.

In the course of gypsum core manufacture the boric acid may be added at room temperature to a stucco stream at normal processing temperatures. The glycerol additive is introduced into the gauging water. Thus, neither addition affects normal manufacturing procedures. Both glycerol and boric acid of substantially 100% purity are available for carrying out this invention, and the additives in such purity were employed in the above specimens set forth in the table and test. All of the hemihydrate in the examples above set forth was formed from gypsum of 94.4% purity.

In a typical electric cable, radiant heating system as above indicated, the cable is normally stapled in place over a gypsum board or plaster base, after which a plaster surfacing is applied to completely cover the cable. Obviously the thinner the plaster coating the more readily the cable heat is radiated to the atmosphere adjacent the outer plaster surface comprising the heat-radiating surface. It is desirable, therefore, that the plaster coating in addition to being non-cracking at elevated temperatures, be as thin as possible while affording complete coverage of the underlying heating cable. The desired electric cable, radiant heating system would employ both plaster and plaster base able to retain water of crystallization at temperatures of 125° F. or greater.

Although the above-discussed plaster and core compositions are primarily intended for use in radiant heating systems wherein an electrical cable, hot fluid or other heat source generates an elevated temperature in the neighborhood of 125° F., the gypsum compositions of this invention have other obvious uses as in boiler rooms, uninsulated attics, etc., where temperatures of this magnitude are encountered.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A composition comprising calcium sulfate hemihydrate, boric acid, and glycerol; said composition being convertible into a formable mixture that is capable of setting to a hard gypsum characterized by a substantial resistance to dehydration at a temperature of 150° F. upon admixture with an amount of water in excess of that required to hydrate said hemihydrate to the dihydrate; said boric acid being present in the amount of .05% to .65% by weight of the calcium sulfate hemihydrate; said glycerol being present in the amount of .05% to 1.25% by weight of the calcium sulfate hemihydrate.

2. A hard gypsum product formed from water and calcium sulfate hemihydrate having uniformly admixed therewith boric acid and glycerol present in the amounts of .05% to .65% and .05% to 1.25% respectively based on the weight of said hemihydrate; said gypsum product having a substantial resistance to dehydration at a temperature of 150° F.

3. The hard gypsum product of claim 2 disposed in the form of a gypsum board core enveloped by a paper wrapper and in which effective quantities of an accelerator, an extender, a retarder, fibers, a soap and a bonding agent are contained in said core.

4. A gypsum board comprising a fibrous wrapper disposed about a gypsum core formed from water, calcium sulfate hemihydrate, boric acid and glycerol; said boric acid and glycerol being present in the amounts of .05% to .65% and .05% to 1.25% respectively, based on the weight of the calcium sulfate hemihydrate; said gypsum being characterized by substantial resistance to dehydration when subjected to a temperature of 150° F., and by secure bonding thereof to said fibrous wrapper.

5. A plaster composition comprising for every 100 pounds by weight calcium sulfate hemihydrate, 10 pounds insoluble calcium sulfate anhydrite, 60 pounds sand, 5 pounds double hydrated dolomitic lime, 0.55 pounds spray-dried polyvinyl acetate, 0.5 pound glycerol, 0.05 cubic foot of perlite fines, 0.25 pound boric acid and .025 pound tartaric acid; said composition being convertible into a mix that is capable of setting to a hard gypsum surfacing characterized by a substantial resistance to dehydration at a temperature of 150° F. upon admixture of said composition with an amount of water adequate to hydrate said hemihydrate to calcium sulfate dihydrate and facilitate troweling of the mix.

6. The plaster composition of claim 5 in which said glycerol is coated on said sand.

7. A hard gypsum surfacing formed from a mix comprising the composition of claim 5 and an amount of water adequate to hydrate the calcium sulfate hemihydrate to calcium sulfate dihydrate and to facilitate troweling of said mix.

References Cited

UNITED STATES PATENTS

| 1,708,436 | 4/1929 | Weinstein | 106—110 |
| 1,732,737 | 10/1929 | Wiggin et al. | 106—315 |
| 2,078,199 | 4/1937 | King | 106—114 |
| 2,557,083 | 6/1951 | Eberl | 106—111 |
| 3,305,518 | 2/1967 | Jakacki | 106—110 |

FOREIGN PATENTS

| 491,826 | 9/1938 | Great Britain. |

TOBIAS E. LEVOW, *Primary Examiner.*

S. E. MOTT, *Examiner.*